(No Model.)

C. C. NEWTON.
METAL SAW.

No. 523,862. Patented July 31, 1894.

Witnesses:
F. D. Goodwin
Will A. Barr

Inventor:
Charles C. Newton
by his Attorneys
Howson & Howson

UNITED STATES PATENT OFFICE.

CHARLES C. NEWTON, OF PHILADELPHIA, PENNSYLVANIA.

METAL-SAW.

SPECIFICATION forming part of Letters Patent No. 523,862, dated July 31, 1894.

Application filed April 23, 1894. Serial No. 508,593. (No model.)

*To all whom it may concern:*

Be it known that I, CHARLES C. NEWTON, a citizen of the United States, residing in Philadelphia, Pennsylvania, have invented certain Improvements in Metal-Saws, of which the following is a specification.

The object of my invention is to construct a metal saw in such a manner that the cutting surface is made up of a series of segments secured to the main body of the saw so that if any one of the segments should be broken or otherwise injured it can be removed and another segment substituted therefor. The main feature of my invention is the arrangement of the segments so that they will be locked together and be held firmly in position.

Figure 1:
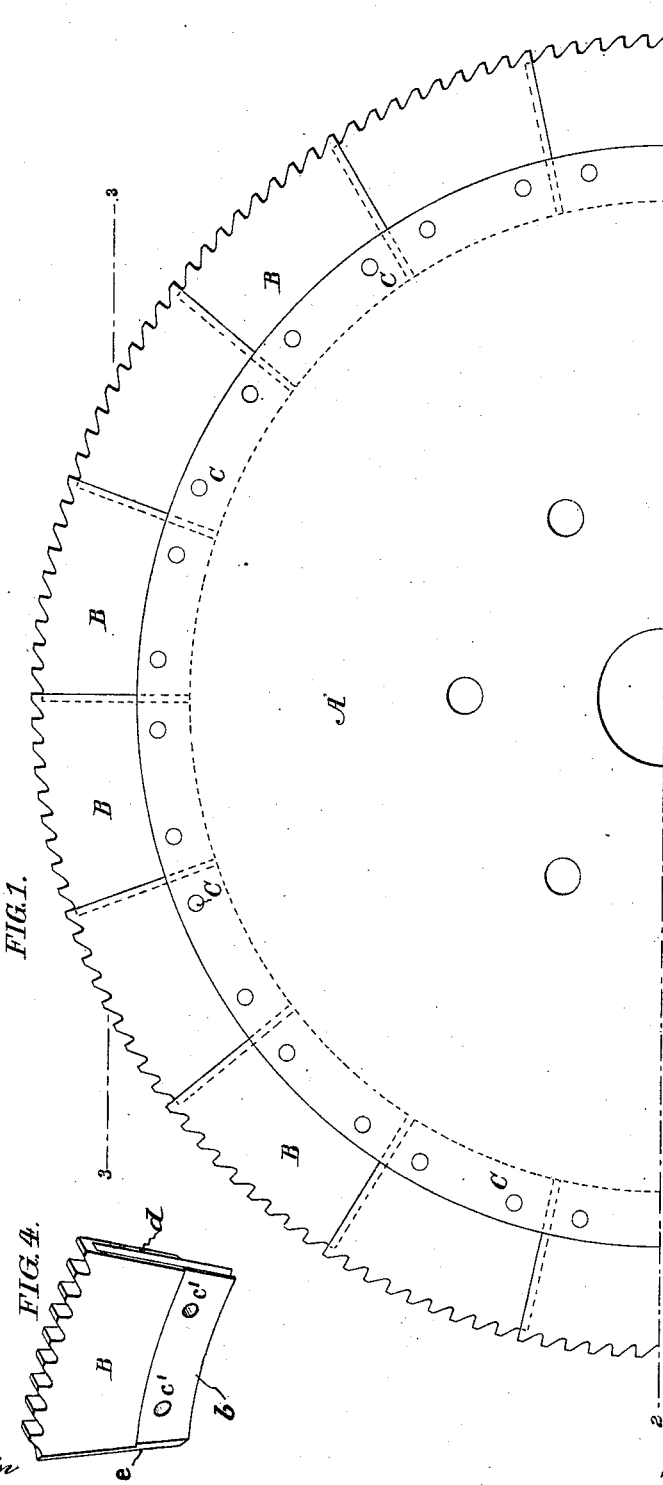
Figure 3:
Figure 2:
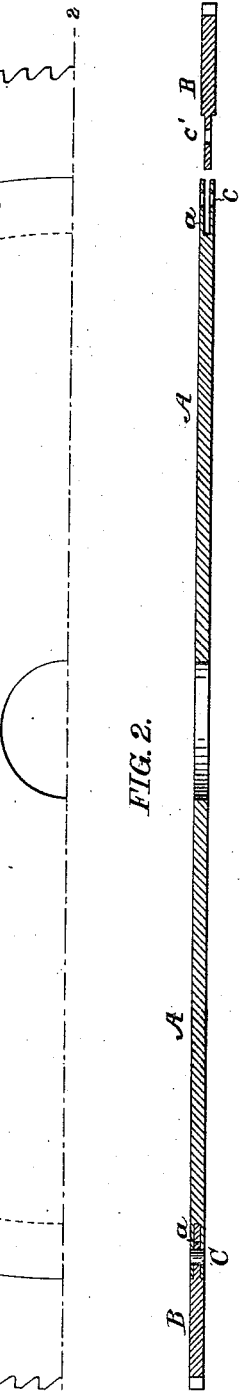
Figure 4:
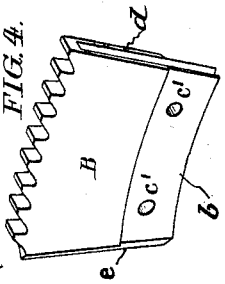

In the accompanying drawings:—Figure 1, is a side view of one half of my improved metal cutting circular saw. Fig. 2, is a section on the line 2—2, Fig. 1, with one of the segments removed. Fig. 3, is a section on the line 3—3, Fig. 1. Fig. 4, is a perspective view of one of the segments.

In constructing circular saws for cutting metal they must be made strong and rigid to withstand the strains to which they are subjected and consequently in order to provide a saw with detachable segments the segments must be so constructed that they will be perfectly rigid at the cutting edge in order to withstand such strains.

Referring to the drawings A is the body of the saw having the usual hole for the mandrel and having an annular groove $a$ cut in its edge.

B are the segments having on one edge a series of teeth of any size or form desired and having a tongue $b$ which is adapted to fit into the groove $a$ in the periphery of the body A of the saw.

In the body of the saw are a series of holes $c$ and in the tongue $b$ of each segment are holes $c'$ which, when the segment is in position, align with the holes $c$ in the body of the saw and adapted to these holes are snugly fitting pins C which hold the two parts together. In one edge $d$ of each segment is a groove, preferably V-shaped as shown in Fig. 4, and on the opposite edge of the segment is a V-shaped tongue $e$ adapted to the groove of an adjoining segment so that when the segments are arranged in position the tongues rest in the grooves and firmly lock the segments together and will keep them in line one with another.

While I prefer to form the groove and the tongue V-shaped as shown, they may be straight tongues or grooves or may be formed in any manner so that the segments will be locked together. Thus I am enabled, by this construction, to make a saw especially adapted to sawing metal that can be repaired by simply substituting one segment for another and which will always be true and in line, the saw being rigid at the periphery.

I claim as my invention—

1. The combination in a circular saw for cutting metal, of the body A having an annular groove, a series of segments having tongues adapted to said groove and fastened therein, one edge of each segment having a groove and the other edge of the segment having a tongue adapted to the groove in an adjoining segment so that when the segments are mounted on the saw body they will be rigidly supported in line, substantially as described.

2. The combination in a circular saw for sawing metals, of the saw blade, segments secured thereto, with a V-shaped groove in one edge of each segment and a V-shaped tongue on the opposite edge, the tongue of one section being adapted to the groove of an adjoining section so that when the segments are mounted on the body of the saw they will be perfectly rigid and in line, substantially as described.

In testimony whereof I have signed my name to this specification in the presence of two subscribing witnesses.

CHARLES C. NEWTON.

Witnesses:
 WILL A. BARR,
 JOSEPH H. KLEIN.